United States Patent
Curtis et al.

(10) Patent No.: US 8,230,001 B2
(45) Date of Patent: Jul. 24, 2012

(54) PROVIDING INFORMATION ABOUT A SYSTEM USING SCRIPTS

(75) Inventors: James R. Curtis, Placerville, CA (US); Eric Soderberg, Mountain View, CA (US); Morris Lee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2862 days.

(21) Appl. No.: 10/856,330

(22) Filed: May 28, 2004

(65) Prior Publication Data

US 2005/0267933 A1     Dec. 1, 2005

(51) Int. Cl.
*G06F 15/16* (2006.01)
(52) U.S. Cl. ..................................... 709/203
(58) Field of Classification Search .................. None
See application file for complete search history.

(56) References Cited

U.S. PATENT DOCUMENTS

| 6,775,699 | B1 * | 8/2004 | DeLuca et al. | 709/224 |
| 6,889,255 | B1 * | 5/2005 | DeLuca | 709/224 |
| 7,320,004 | B1 * | 1/2008 | DeLuca et al. | 707/102 |
| 2002/0023154 | A1 * | 2/2002 | Singh | 709/224 |
| 2004/0220954 | A1 * | 11/2004 | Zhou et al. | 707/101 |
| 2004/0225491 | A1 * | 11/2004 | Chang | 704/2 |

FOREIGN PATENT DOCUMENTS

JP     200421549     1/2004

* cited by examiner

*Primary Examiner* — John Follansbee
*Assistant Examiner* — Alan S Chou (57) ABSTRACT

Methods and systems for providing information a client requested about a system using scripts are described. In one embodiment, one or more scripts request information about a computer system. A translator receives the information about the system from the scripts. The translator stores the information about the system in readily accessible data structures.

34 Claims, 3 Drawing Sheets

PROVIDING INFORMATION ABOUT A SYSTEM USING SCRIPTS

TECHNICAL FIELD

Embodiments of the present invention relate to providing information about systems. More specifically, embodiments of the present invention relate to using scripts as a part of obtaining the information from the system.

BACKGROUND ART

Frequently, applications for obtaining information about systems are implemented using clients and servers. For example, the systems may be a networking systems, power supplies, a system that communicates with disk drives, etc. An application may use the information about the systems to report the status of the systems to people who read the reports. For example in this case, the storage capacity of a disk drive may be low and a report may be made of this condition. The application may even take actions based on the information to correct problems occurring on the systems. For example in this case, if the storage capacity of a disk drive is low, actions may be taken to move data from one disk drive to another disk drive.

DISCLOSURE OF THE INVENTION

The present invention allows providers to be coded in a different language than the object manager. The present invention allows for new providers without negatively impacting the quality of the object manager. The present invention does not require the time consuming process of re-compiling, link-editing and installing providers while testing.

Embodiments of the present invention pertain to methods and systems for providing information about systems using scripts is described. In one embodiment, one or more scripts request information about a computer system. A translator receives the information about the system from the scripts. The translator stores the information about the system in readily accessible data structures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail so as not to unnecessarily obscure aspects of the present invention.

System and Functional Overviews

Figure 1:
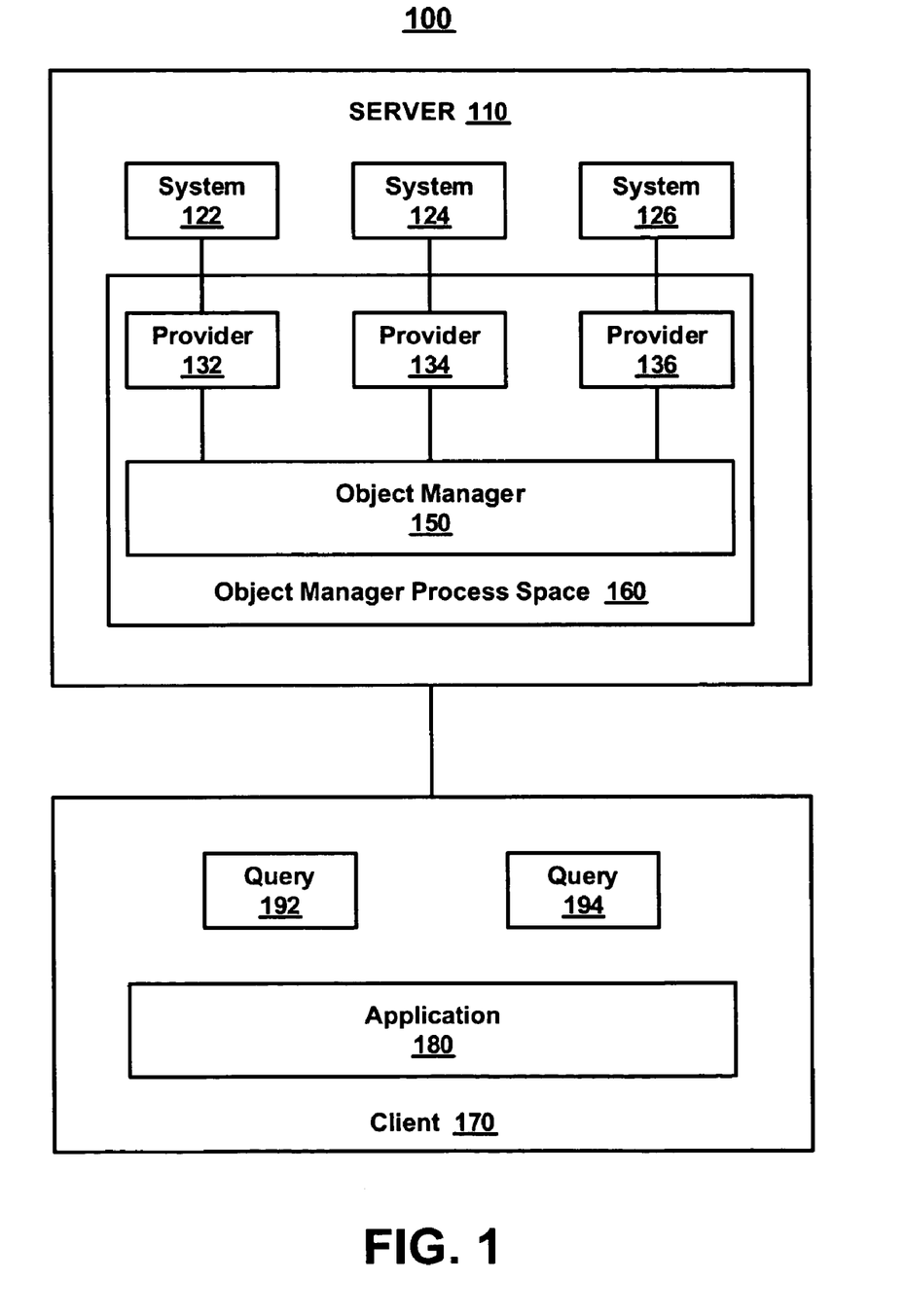
FIG. 1 depicts a block diagram of a prior art client-server system for obtaining information about a system.

FIG. 1 depicts a block diagram of a prior art client-server system for obtaining information about a system. Client 170 includes an application 180 and queries 192, 194. Server 110 includes an object manager process space 160 and systems 122, 124, 126. The object manager process space 160 in turn includes the object manager 150 and providers 132, 134, 136. As depicted in FIG. 1, provider 132 is coupled to system 122, provider 134 is coupled to system 124, and provider 136 is coupled to system 126.

The application 180 at client 170 may request information about systems 122, 124, 126 from server 110 using queries 192, 194. These queries 192, 194 may be SQL type queries. The object manager 150 receives the queries 192, 194 and determines which provider 132, 134, 136 is appropriate for obtaining the requested information from the systems 122, 124, 126 in response to the queries 192, 194. For example, if system 122 is a networking system and a query 192 was received requesting the transfer rate of the networking system, then object manager 150 would use provider 132 to obtain the requested information. Similarly, if system 124 is a disk drive system and a query 194 was received requesting the storage capacity of the disk drive system, then object manager 150 would use provider 134 to obtain the requested information.

Typically, an object manager 150 and application 180, or parts of application 180, may be implemented by programmers working for one company, whereas providers 132, 134, 136 are implemented by programmers working for the companies that sell the systems 122, 124, 126. Continuing the example, object manager 150 and application 180 may be implemented by a company that sells system monitoring software, whereas, provider 132 may be implemented by a company that sells network systems, e.g., system 122.

According to the implementation depicted in FIG. 1, the providers 132, 134, 136 reside in the same address space 160 as the object manager 150. Therefore, the providers 132, 134, 136 are coded using the same language as object manager 150. If the companies that implement systems 122, 124, 126 do not have programmers that can program in the language that object manager 150 is coded in, the companies may not be willing to implement providers 132, 134, 136 that work with object manager 150. This would reduce the market share that the company responsible for object manager 150 would be able to reach.

Further, the object manager 150 is vulnerable to the quality of the providers 132, 134, 136. For example, if the providers 132, 134, 136 have memory leaks, then the performance of the object manager 150 will degrade and possibly the object manager 150 will crash over a period of time as it is executed. In a second example, the providers 132, 134, 136 may use un-initialized variables for referencing storage which would also have a negative effect on the quality of the object manager 150.

As more companies provide more systems, the object manager 150 will need to be tested with new providers. To test the new providers, a client 170 will need to be connected to the server 110 to issue queries 192, 194. Each time a bug is found in the new providers, the providers 132, 134, 136 will need to be re-compiled, link-edited, and installed on the server 110, which is a time consuming process.

For these and other reasons, a method and/or a system that allows for providers to be coded in a different language than the object manager would be valuable. A method and/or system that allows for new providers without negatively impacting the quality of the object manager would also be value. A method and/or system that does not require the time consuming process of re-compiling, link-editing and installing providers while testing would also be value.

Figure 2:
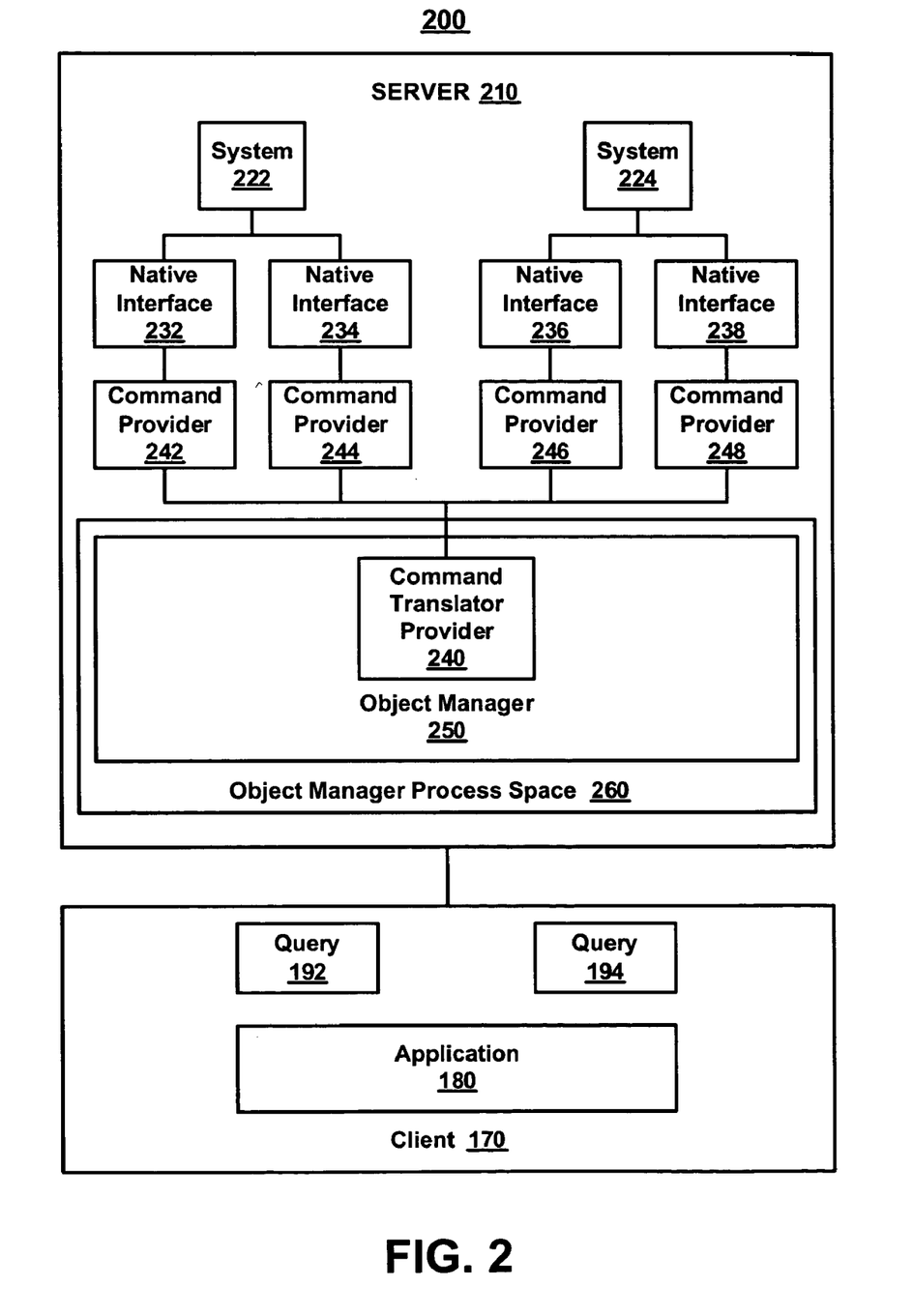
FIG. 2 is a block diagram of an exemplary client-server system for obtaining information about systems using scripts, according to embodiments of the present invention.

FIG. 2 is a block diagram of an exemplary client-server system 200 for obtaining information about systems using scripts, according to embodiments of the present invention. As depicted in FIG. 2, the client-server system 200 includes a client 170, as already described herein, and a server 210. Server 210 includes an object manager 250, a command translator provider 240, command providers 242, 244, 246, 248, native interfaces 232, 234, 236, 238, and systems 222, 224. The object manager 250 and the command translator provider 240 reside in the process space 260.

According to one embodiment of the present invention, command providers 242, 244, 246, 248 are coded using scripting languages, such as sh (POSIX or Bourne Shell), ksh (Korn Shell), csh (C Shell), Perl, Javascript, or Common Gateway Interface (CGI) scripts. As a result, programmers working for the companies that implement the systems 222, 224 may code the command providers 242, 244, 246, 248 in any scripting language that they choose. Further, since the command providers 242, 244, 246, 248 are scripts, they can be coded quickly and do not need to be re-compiled, link-edited and re-installed each time programmers modify them in the course of debugging them. Thus, significant amounts of time are saved in implementing the command providers 242, 244, 246, 248. Additionally, since the command providers 242, 244, 246, 248 are scripts, they do not need to reside in the same address space 260 as the object manager 250. As a result, the quality of the command providers 242, 244, 246, 248 will not have a negative impact on the quality of the object manager 250.

According to another embodiment, the command providers 242, 244, 246, 248 cause interfaces 232, 234, 236, 238 that are native (referred to hereinafter as "native interfaces") to systems 222, 224 to be executed. For example, system 222 may be a networking system and native interface 234 may be a Netstat command that the networking system provides. Further, the Netstat command may provide values for attributes such as the transfer rate and/or bit rate of the networking system.

According to one embodiment, the object manager 250 is a collector of information about systems. For example, object manager 250 may collect information about systems 222, 224 and filter what portions of the collected information may be provided to client 170 based on what information is requested by client 170, as will become more evident.

The blocks in FIG. 2 can be arranged differently than as illustrated, and can implement additional or few features than what are described herein. For example, the command providers 242, 244, 246, 248 may be communicatively coupled to more than one native interface. In another example, object manager 250 may be backwards compatible. In this case, object manager 250 may interact with providers, such as providers 132, 134, 136 (FIG. 1), as well as command translator provider 240 (FIG. 2).

The Common Format

According to one embodiment, the command providers 242, 244, 246, 248 provide information about systems 222, 224 in a common format to a command translator provider 240. According to another embodiment, the common format is defined by the Common Information Modeling (CIM) specification from the Desktop Management Task Force (DMTF). Refer to http://dmtf.org for information on CIM. In this case, the common format may list the attributes followed by the values of the attributes that the command translator provider 240 receives from the command provider 242, 244, 246, 248 enclosed in brackets, as follows:

TABLE 1

Example of the Common Format

| Line No. | Lines of the Common Format |
| --- | --- |
| 1 | INSTANCE { |
| 2 | ATTRIBUTE 1 = Value 1; |
| 3 | ATTRIBUTE 2 = Value 2; |
| . | . |
| . | . |
| . | . |
| N | } |

In the case of the Netstat command, the common format may be take the following form:

TABLE 2

Example of the Common Format for the Netstat Command

| Line No. | Lines of the Common Format |
| --- | --- |
| 1 | INSTANCE { |
| 2 | TRANSFER RATE = 1 MB/sec; |
| . | . |
| . | . |
| . | . |
| N | } |

According to another embodiment, the common format may be defined by any markup language, such as Hypertext Markup Language (HTML), Extensible Markup Language (XML), and Vector Markup Language (VML). Further, the common format may be defined with any Data Definition Language (DDL), such as those that are used by SQL-type databases.

Detailed System Description

As depicted in FIG. 2, the application 180 at client 170 may request information about systems 222, 224 from server 210 using queries 192, 194. Object manager 250 receives these queries 192, 194. Based on the queries 192, 194, the object manager 250 determines whether the command translator provider 240 can obtain the information the queries 192, 194 requested. Assuming that command translator provider 240 (also known as a "translator") can obtain the information, the command translator provider 240 determines which command provider 242, 244, 246, 248 can obtain the requested information.

The command providers 242, 244, 246, 248 cause the native interfaces 232, 234, 236, 238 to be executed to obtain information from the systems 222, 224. According to one embodiment, these native interfaces 232, 234, 236, 238 may be commands or application programmer interfaces (APIs) that are supported by the systems 222, 224. Assuming that command translator provider 240 determined that the requested information can be obtained from command provider 244, then command provider 244 may cause native interface 234 to be executed to obtain information from system 222. Native interface 234 provides the information obtained from system 222 to command provider 244. Command provider 244 parses the obtained information and provides it to the command translator provider 240.

According to one embodiment, the command providers 242, 244, 246, 248 provide information about systems 222, 224 in a common format to a command translator provider 240, as described herein. The command translator provider 240 obtains the requested information from the common format and provides the requested information to the object manager 250 in readily accessible data structures. The object manager 250 provides the requested information from the data structures to the client 170 in response to the queries 192, 194.

According to one embodiment, object manager 250, command translator provider 240, and the command providers 242, 244, 246, 248 communicate with each other using classes. In this case, object manager 250 may store information describing what classes command translator provider 240 uses to provide information to object manager 250 with. Similarly, command translator provider 240 may store information describing what classes each of the command providers 242, 244, 246, 248 use to provide information to the command translator provider 240 with, according to another embodiment.

Continuing the example, a class may be defined that has attributes for the values that the Netstat command, e.g., native interface 234, may obtain from the networking system, e.g., system 222. This class shall be referred to hereinafter as the "Netstat Class." In this case, object manager 250 may store information indicating that it may obtain the value of the transfer rate from command translator 240 using the Netstat class. Further, command translator 240 may store information indicating that it may obtain the value of the transfer rate from the native interface 234 using the Netstat class.

When application 180 issues a query 192, 194 requesting the transfer rate of the networking system, object manager 250 may use its stored information to determine that the transfer rate may be obtained from command translator provider 240. Similarly, command translator provider 240 may use its stored information to determine that it may request the transfer rate from command provider 244.

According to one embodiment, the data structures that command translator provider 240 uses to provide requested information to object manager 250, are instances of classes, as will be described in more detail. According to another embodiment, the instances of the classes may be implemented as tables.

Operational Example

Figure 3:
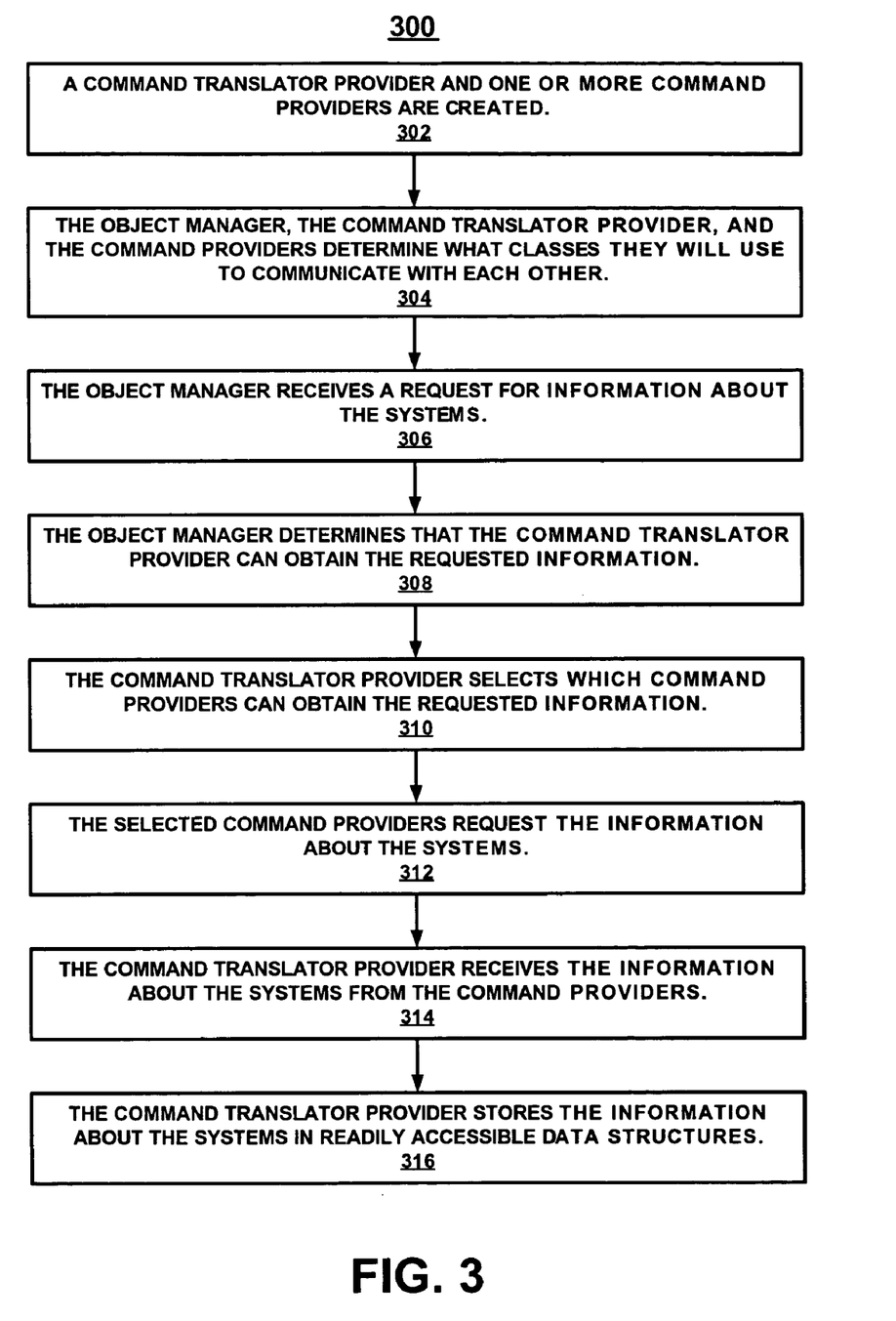
FIG. 3 depicts a flowchart 300 for obtaining information about systems using scripts, according to embodiments of the present invention.

FIG. 3 depicts a flowchart 300 for obtaining information about systems using scripts, according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device.

For the purposes of illustration, the discussion of flowchart 300 shall refer to the structures depicted in FIG. 2. Further, for the purposes of illustration, the discussion of flow chart 300 shall assume that: (1) system 222 is a networking system and system 224 is a disk drive system that interacts with disk drives A, B, and C; (2) native interface 234 is a Netstat command and native interface 236 is an API for obtaining information about disk drives (referred to herein as the "disk drive API"); (3) application 180 issues a query 192 requesting the storage capacity of all the disk drives A, B, C that the disk drive system supports and the transfer rate of the networking system; (4) object manager 250 is backwards compatible and, therefore, is communicatively coupled with providers 132, 134, 136 as well as command translator provider 240.

In step 302, a command translator provider and one or more command providers are created, according to one embodiment. For example, programmers that work for a company that sells monitoring software may create a command translator provider 240 and programmers that work for companies that sell systems 222, 224, such as a networking system and a disk drive system, may create command providers 244, 246, according to another embodiment. The command providers 244, 246 would be created using scripts, according to still another embodiment.

In step 304, the object manager, the command translator provider, and the command providers determine what classes they will use to communicate with each other, according to another embodiment embodiment. For example, the object manager 250 communicates with the command translator provider 240 and the other providers 132, 134, 136 to determine what classes the command translator provider 240 and the other providers 132, 134, 136 will use to provide requested information with, according to another embodiment. Continuing the example, the command translator provider 240 and the object manager 250 will communicate using the Netstat class and another class (referred to hereinafter as the "disk drive class") with attributes for the values the disk drive API provides. The Netstat class may have an attribute for the transfer rate, among other things, and the disk drive class may have an attribute for storage capacity, among other things.

The object manager 250 stores information describing what classes the command translator provider 240 and the other providers 132, 134, 136 will use, according to still another embodiment. In this case, the object manager 250 may store information describing the netstat class and the disk drive class as well as information that maps these two classes to the command translator provider 240.

Further, the command translator provider 240 communicates with the command providers 242, 244, 246, 248 to determine what classes the command providers 242, 244, 246, 248 will use to provide requested information with, according to one embodiment. In this case, command provider 244 may use the netstat class to communicate with the command translator provider 240, Similarly, command provider 246 may use the disk drive class to communicate with the command translator provider 240.

The command translator provider 240 stores information describing what classes the command providers 242, 244, 246, 248 will use, according to another embodiment. In this case, the command translator provider 240 may store information describing the netstat class and the disk drive classes well as information mapping the netstat class to command provider 244 and the disk drive class to command provider 246.

In step 306, the object manager receives a request for information about one or more systems, according to yet another embodiment. Continuing the example, application 180 issues a query 192 requesting the storage capacity of all the disk drives that the disk drive system (system 224) supports and the transfer rate of the networking system (system 222). Object manager 250 receives the query 192.

In step 308, the object manager determines that the command translator provider can obtain the requested information, according to one embodiment. The object manager 250 may determine to obtain the requested information from the command translator provider 240 based on the stored classes, according to another embodiment. For example, the object manager 250 previously stored information that command translator provider 240 can provide information about systems 222, 224 that pertain to the netstat class and the disk drive class. In this case, the requested information (e.g., transmission rate and storage capacities of all the disk drives) pertain to the netstat class and the disk drive class. Therefore, the object manager 250 can use the information stored in step 304 to determine that the command translator provider 240 can obtain the requested information.

In step 310, the command translator provider selects which command providers can obtain the requested information, according to another embodiment. According to still another embodiment, the command translator provider 240 determines which command providers 242, 244, 246, 248 to obtain the requested information from based on the stored classes. For example, the command translator provider 240 uses use the information stored in step 304 to determine that command provider 244 can provide information about the transfer rate. Similarly, the command translator provider 240 can use the information it previously stored to determine that command provider 246 can provide information about the storage capacity of all the disk drives.

In step 312, the selected command providers request the information about the systems, according to still another embodiment. According to yet another embodiment, the selected command providers 244, 246 may respectively cause the execution of native interfaces 234, 236 to obtain output from the native interfaces 234, 236. The output may include the requested information, among other things. Continuing the example, the output from native interface 234 may include the transfer rate and the output of native interface 236 may include the storage capacity of disk drives A, B, and C.

The command providers 244, 246 may respectively parse the output from the native interfaces 234, 236 and provide values, such as the transfer rate and the storage capacity, in common formats such as that depicted in table 1 to the command translator provider 240, according to one embodiment. In this case, command provider 244 may provide output, such as that depicted in table 1, where an attribute (line 1 of table 1) is "transfer rate" and the value (line 1 of table 1) is the value of the transfer rate. Similarly, the command provider 246 may provide output, such as that depicted in table 1, where the attribute (line 1 of table 1) is "storage capacity", and the values (line 1 of table 1) are the values of the storage capacities of disk drives A, B, C (referred to hereinafter as the "netstat output in common format"). Since, application 180 requested the storage capacity for all the disk drives that system 224 supports, command provider 246 may provide three sets of output for the disk drives A, B, and C (referred to hereinafter as the "disk drive output in common format").

In step 314, the command translator provider receives the information about the systems from the command providers, according to one embodiment. For example, command translator provider 240 may receive the netstat output in common format from command provider 244 and the three disk drive outputs in common format for disk drives A, B, and C.

In step 316, the command translator provider stores the information about the systems in readily accessible data structures, according to still another embodiment. For example, the command translator provider 240 may store the output (e.g., the netstat output in common format and the three disk drive outputs in common format) in data structures that the object manager 250 may readily access, according to yet another embodiment. The data structures may be instances of classes, such as the netstat class and the disk drive class.

Continuing the example, the command translator provider 240 may create one instance of the netstat class and initialize the attributes with the values from the netstat output in common format. Similarly, the command translator provider 240 may create three instances of the disk drive class and initialize the attributes with the values from the disk drive output in common format.

According to another embodiment, information stored in instances of classes are types of information. For example, the information stored in an instance of the netstat class is one type of information whereas information stored in an instance of the disk drive class is another type of information.

The object manager 250 may be a collector of information from one or more systems 222, 224, according to one embodiment. For example, the object manager 250 in this operational example has collected information from a netstat command and information from a disk drive API for systems 222 and 224. Further, according to another embodiment, the object manager 250 may filter what portions of the collected information are provided to client 170 based on what information the client 170 requested. For example, client 170 requested the transaction rate and the storage capacity for all the disk drives in step 306. The object manager 250 may take the transfer rate from the one instance of the netstat class and the storage capacities from the three instances of the disk drive class and provide those values to the application 180 on client 170 in response to query 192.

CONCLUSION

In the prior art as depicted in FIG. 1, the providers 132, 134, 136 are coded in the same language as the object manager 150. According to one embodiment of the present invention, command providers 242, 244, 246, 248 (FIG. 2) are coded using scripting languages. As a result, programmers working for the companies that implement the systems 222, 224 may code the command providers 242, 244, 246, 248 in any scripting language that they choose.

Further, since the command processors 242, 244, 246, 248 are scripts, they do not need to reside in the same address space 260 as the object manager 250. As a result, the quality of the command providers 242, 244, 246, 248 will not have a negative impact on the quality of the object manager 250.

Since the command providers 242, 244, 246, 248 are scripts, not only can they be coded quickly, but they do not need to be re-compiled, link-edited and re-installed each time programmers modify them in the course of debugging them, thus, saving on development time. For example, an ordinary prior art provider 132, 134, 136 may take a week to implement whereas a command provider 242, 244, 246, 248 of the present invention with analogous function may take only a day to implement.

Further, in order to test prior art providers 132, 134, 136, application 180 needs to issue queries 192, 194. However, according to one embodiment, the command providers 242, 244, 246, 248 may be tested without the application 180 on client 170 and may be tested independent from other code, such as other command providers 242, 244, 246, 248 and even the object manager 250. For example, the scripts (e.g., command providers 244-248) can be tested by executing them and inspecting the output. Thus, if the other code (such as the object manager 250 or the application 180) breaks, testing of the command providers 242, 244, 246, 248 does not have to be stopped.

What is claimed is:

1. A method of providing information about a system using scripts, the method comprising:
    requesting said information at one or more command providers about said system, wherein said one or more command providers are scripts;
    receiving at a command translator provider said information about said system from said one or more command providers; and
    said command translator provider storing said information about said system in readily accessible data structures.

2. The method of claim 1, wherein said method further comprises:
    receiving a request at an object manager from a client for said information about said system;
    determining at said object manager to obtain said requested information from a command translator provider;
    determining at said command translator provider to obtain said requested information from a first command provider of one or more command providers;
    wherein requesting said information further comprises requesting said information by causing execution at said first command provider of a native interface to said system to obtain output from said native interface that includes said requested information;
    wherein receiving said information at said command translator provider further comprises receiving said information from said first command provider by receiving said output in a common format; and
    wherein storing said information further comprises providing said information to said object manager by storing said output in data structures that are readily accessible to said object manager.

3. The method of claim 2, wherein said method further comprises:
    receiving a second request at said object manager from said client for second information about said system;
    requesting said second information by causing execution of a second native interface to obtain second output from said second native interface that includes said second information; and
    receiving said second output at said command translator provider.

4. The method of claim 1, wherein a first and second command providers are tested independently of each other and are tested without a client transmitting queries to a server where said first and second command providers are installed.

5. The method of claim 1, wherein said command translator provider receives said information in a common format that is defined by Common Information Modeling (CIM).

6. The method of claim 1, wherein said scripts are from a group consisting of sh (POSIX or Bourne Shell), ksh (Korn Shell), csh (C Shell), Perl, Javascript, and Common Gateway Interface (CGI) script.

7. The method of claim 2, wherein said native interface consists of one of a command associated with said system and an application programming interface (API) associated with said system.

8. The method of claim 1, wherein said method further comprises:
    determining what classes said command translator provider can use to provide said requested information to an object manager;
    storing first information describing what classes said command translator provider can use;
    determining what classes said one or more command providers can use to provide said requested information to said command translator provider;
    storing second information describing what classes said one or more command providers can use;
    determining at said object manager to obtain said requested information from said command translator provider by analyzing said first information when said object manager receives said request; and
    determining at said command translator provider to obtain said requested information from said first command provider by analyzing said second information.

9. A method of simplifying the obtaining of information about a computer system, the method comprising:
    creating one or more scripts that request information about said computer system;
    creating a translator for receiving said information about said computer system from said scripts; and
    said translator storing said information about said computer system in readily accessible data structures.

10. The method of claim 9, wherein said one or more scripts obtain said information about said computer system from one or more interfaces that are native to said computer system.

11. The method of claim 10, wherein a particular native interface is from a group consisting of a command associated with said system and an application programming interface (API) associated with said system.

12. The method of claim 9, wherein said one or more scripts are command providers that are tested independently of each other and are tested without a client transmitting queries to a server where said command providers are installed.

13. The method of claim 9, wherein said scripts provide said information to said translator in a common format that is defined by Common Information Modeling (CIM).

14. The method of claim 9, wherein said method further comprises:
    creating said one or more scripts and said translator to communicate with each other using classes, wherein said classes represent types of said information that are obtained from said computer system; and
    creating said translator to obtain said information from a particular script based on said classes.

15. An information retrieval system comprising:
    a command translator provider that is communicatively coupled to a object manager;
    one or more command providers that are communicatively coupled to said command translator, wherein said one or more command providers are scripts;

the processor for executing a method for providing information about said system using scripts, the method comprising:
said one or more command providers requesting said information about said computer system;
said command translator provider receiving said information about said computer system from said command providers; and
said command translator provider storing said information about said computer system in readily accessible data structures.

16. The system of claim 15, wherein said one or more command providers obtain said information about said computer system from one or more interfaces that are native to said computer system.

17. The system of claim 16, wherein a particular native interface is from a group consisting of one of a command associated with said system and an application programming interface (API) associated with said system.

18. The system of claim 15, wherein said one or more command providers are tested independently of each other and are tested without a client transmitting queries to a server where said command providers are installed.

19. The system of claim 15, wherein said command translator provider receives said information in a common format that is defined by Common Information Modeling (CIM).

20. The system of claim 15, wherein said method further comprises:
communicating between said command translator provider, and said one or more command providers with classes, wherein said classes represent types of said information that are obtained from said computer system; and
determining at said command translator provider to obtain said information from a particular command provider based on said classes.

21. A non-transitory computer-usable medium having computer-readable program code embodied therein for causing a computer system to perform a method of providing information about a system using scripts, the method comprising:
requesting said information at one or more command providers about said system, wherein said one or more command providers are scripts;
receiving at a command translator provider said information about said system from said one or more command providers; and
said command translator provider storing said information about said system in readily accessible data structures.

22. The computer-usable medium of claim 21, wherein said method further comprises:
receiving a request at an object manager from a client for said information about said system;
determining at said object manager to obtain said requested information from a command translator provider;
determining at said command translator provider to obtain said requested information from a first command provider of one or more command providers;
wherein requesting said information further comprises requesting said information by causing execution at said first command provider of a native interface to said system to obtain output from said native interface that includes said requested information;
wherein receiving said information at said command translator provider further comprises receiving said information from said first command provider by receiving said output in a common format; and
wherein storing said information further comprises providing said information to said object manager by storing said output in data structures that are readily accessible to said object manager.

23. The computer-usable medium of claim 22, wherein said method further comprises:
receiving a second request at said object manager from said client for second information about said system;
requesting said second information by causing execution of a second native interface to obtain second output from said second native interface that includes said second information; and
receiving said second output at said command translator provider.

24. The computer-usable medium of claim 21, wherein a first and second command providers are tested independently of each other and are tested without a client transmitting queries to a server where said first and second command providers are installed.

25. The computer-usable medium of claim 21, wherein said command translator provider receives said information in a common format that is defined by Common Information Modeling (CIM).

26. The computer-usable medium of claim 21, wherein said scripts are from a group consisting of sh (POSIX or Bourne Shell), ksh (Korn Shell), csh (C Shell), Perl, Javascript, and Common Gateway Interface (CGI) script.

27. The computer-usable medium of claim 22, wherein said native interface consists of one of a command associated with said 1ystem and an application programming interface (API) associated with said system.

28. The computer-usable medium of claim 21, wherein said method further comprises:
determining what classes said command translator provider can use to provide said requested information to an object manager;
storing first information describing what classes said command translator provider can use;
determining what classes said one or more command providers can use to provide said requested information to said command translator provider;
storing second information describing what classes said one or more command providers can use;
determining at said object manager to obtain said requested information from said command translator provider by analyzing said first information when said object manager receives said request; and
determining at said command translator provider to obtain said requested information from said first command provider by analyzing said second information.

29. A non-transitory computer-usable medium of simplifying the obtaining of information about a computer system, the method comprising:
creating one or more scripts that request information about said computer system;
creating a translator for receiving said information about said computer system from said scripts; and
said translator storing said information about said computer system in readily accessible data structures.

30. The computer-usable medium of claim 29, wherein said one or more scripts obtain said information about said computer system from one or more interfaces that are native to said computer system.

31. The computer-usable medium of claim 30, wherein a particular native interface is from a group consisting of a command associated with said system and an application programming interface (API) associated with said system.

32. The computer-usable medium of claim 29, wherein said one or more scripts are command providers that are tested independently of each other and are tested without a client transmitting queries to a server where said command providers are installed.

33. The computer-usable medium of claim 29, wherein said scripts provide said information to said translator in a common format that is defined by Common Information Modeling (CIM).

34. The computer-usable medium of claim 29, wherein said method further comprises:
  creating said one or more scripts and said translator to communicate with each other using classes, wherein said classes represent types of said information that are obtained from said computer system; and
  creating said translator to obtain said information from a particular script based on said classes.

\* \* \* \* \*

UNITED STATES PATENT AND TRADEMARK OFFICE
CERTIFICATE OF CORRECTION

| | |
|---|---|
| PATENT NO. | : 8,230,001 B2 |
| APPLICATION NO. | : 10/856330 |
| DATED | : July 24, 2012 |
| INVENTOR(S) | : James R. Curtis et al. |

It is certified that error appears in the above-identified patent and that said Letters Patent is hereby corrected as shown below:

In column 12, line 30, in Claim 27, delete "1ystem" and insert -- system --, therefor.

Signed and Sealed this
Fifteenth Day of January, 2013

David J. Kappos
*Director of the United States Patent and Trademark Office*